US012287670B2

United States Patent
Zigras

(10) Patent No.: US 12,287,670 B2
(45) Date of Patent: Apr. 29, 2025

(54) ELECTRONIC DEVICES HAVING MORPHING DEVICE HOUSINGS ALLOWING WEARABLE AND HANDHELD MODES OF OPERATION

(71) Applicant: Motorola Mobility LLC, Chicago, IL (US)

(72) Inventor: Ioannis A. Zigras, Chicago, IL (US)

(73) Assignee: Motorola Mobility LLC, Chicago, IL (US)

( * ) Notice: Subject to any disclaimer, the term of this patent is extended or adjusted under 35 U.S.C. 154(b) by 606 days.

(21) Appl. No.: 17/704,488

(22) Filed: Mar. 25, 2022

(65) Prior Publication Data

US 2023/0288957 A1    Sep. 14, 2023

(30) Foreign Application Priority Data

Mar. 8, 2022   (GR) ............................... 20220100219

(51) Int. Cl.
*G06F 1/16* (2006.01)
(52) U.S. Cl.
CPC .......... *G06F 1/1624* (2013.01); *G06F 1/1652* (2013.01); *G06F 1/1679* (2013.01); *G06F 1/1683* (2013.01)
(58) Field of Classification Search
CPC .... G06F 1/1624; G06F 1/1652; G06F 1/1679; G06F 1/1683
See application file for complete search history.

(56) References Cited

U.S. PATENT DOCUMENTS

| | | | | |
|---|---|---|---|---|
| 7,599,709 | B2* | 10/2009 | Kim | H04M 1/026 455/575.4 |
| 7,599,723 | B2* | 10/2009 | Lee | H04M 1/0237 455/575.8 |
| 9,804,571 | B2 | 10/2017 | Lee et al. | |
| 2013/0072079 | A1* | 3/2013 | Tang | G02F 1/133351 445/24 |
| 2013/0335929 | A1 | 12/2013 | Cavallaro | |
| 2014/0162482 | A1 | 6/2014 | Steuer et al. | |
| 2014/0239982 | A1 | 8/2014 | Alameh et al. | |

(Continued)

OTHER PUBLICATIONS

"Wrap Around Concept Prior Art in U.S. Appl. No. 17/704,488, filed Mar. 25, 2022", Pictures of two separate wrap around concepts previously available as early as 2016; Provided by Applicant.

*Primary Examiner* — Raymond S Dean
(74) *Attorney, Agent, or Firm* — Philip H. Burrus, IV

(57) ABSTRACT

An electronic device includes a first device housing and a second device housing that are slidable relative to each other. A flexible display spans a major surface of the electronic device. A strap can be attached to the electronic device so as to span a second major surface of the electronic device, where sliding the first device housing toward the second device housing changes the perimeter of an arm insertion aperture defined by the strap and device housings. A deformable device housing arm can extend between the device housing(s) and the strap and can wrap around a user's arm. The first device housing and second device housing can be manufactured from a flexible material to wrap around an arm allowing a first coupler coupled to the first device housing to attach to a second coupler coupled to the second device housing.

11 Claims, 8 Drawing Sheets

(56) References Cited

U.S. PATENT DOCUMENTS

| | | |
|---|---|---|
| 2014/0239984 A1 | 8/2014 | Alameh et al. |
| 2014/0266624 A1 | 9/2014 | Van Bosch et al. |
| 2014/0274010 A1 | 9/2014 | Cavallaro et al. |
| 2014/0282270 A1 | 9/2014 | Slonneger |
| 2014/0370345 A1 | 12/2014 | Maleki et al. |
| 2015/0206981 A1* | 7/2015 | Komachi ........... H10D 30/6715 257/43 |
| 2016/0088448 A1 | 3/2016 | Han et al. |
| 2023/0384825 A1* | 11/2023 | Connor ................ G04G 17/083 |
| 2025/0013261 A1* | 1/2025 | Connor ................ G06F 1/1652 |

* cited by examiner

ELECTRONIC DEVICES HAVING MORPHING DEVICE HOUSINGS ALLOWING WEARABLE AND HANDHELD MODES OF OPERATION

BACKGROUND

Technical Field

This disclosure relates generally to electronic devices, and more particularly to electronic devices having housings that allow a form factor of the electronic device to change.

Background Art

Portable electronic communication devices, especially smartphones, have become ubiquitous. People all over the world use such devices to stay connected. These devices have been designed in various mechanical configurations. These electronic devices come in different form factors. A first configuration, known as a "candy bar," is generally rectangular in shape, has a rigid form factor, and has a display disposed along a major face of the electronic device. By contrast, a "clamshell" device has a mechanical hinge that allows one housing to pivot relative to the other. It would be desirable to have additional electronic devices with mechanical features offering additional user configurability.

Figure 1:
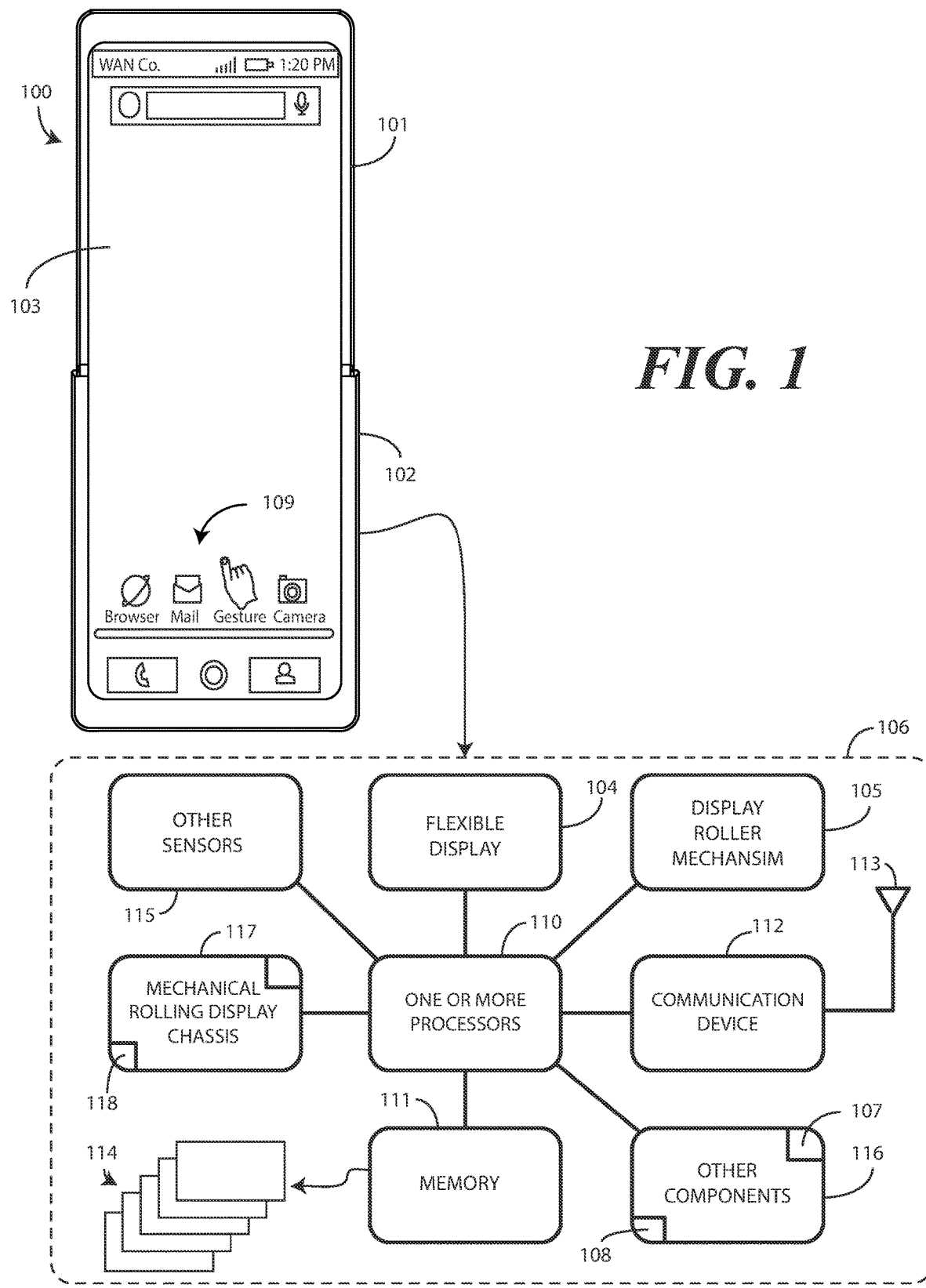
FIG. 1 illustrates one explanatory sliding electronic device in accordance with one or more embodiments of the disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on."

Relational terms such as first and second, top and bottom, and the like may be used solely to distinguish one entity or action from another entity or action without necessarily requiring or implying any actual such relationship or order between such entities or actions. As used herein, components may be "operatively coupled" when information can be sent between such components, even though there may be one or more intermediate or intervening components between, or along the connection path.

The terms "substantially," "essentially," "approximately," "about," or any other version thereof, are defined as being close to as understood by one of ordinary skill in the art, and in one non-limiting embodiment the term is defined to be within ten percent, in another embodiment within five percent, in another embodiment within one percent, and in another embodiment within one-half percent. The term "coupled" as used herein is defined as connected, although not necessarily directly and not necessarily mechanically. Also, reference designators shown herein in parenthesis indicate components shown in a figure other than the one in discussion. For example, talking about a device (10) while discussing figure A would refer to an element, 10, shown in figure other than figure A.

Embodiments of the disclosure provide an electronic device having device housings that slide, bend, and otherwise morph so as to allow the electronic device to be used in both wearable and handheld modes of operation. In the wearable mode of operation, the electronic device can be worn as a watch. In the handheld mode of operation, the electronic device can be used as a traditional smartphone or handheld computer.

By including the morphing housings, electronic devices configured in accordance with embodiments of the disclosure provide ultimate portability in that they free up space in that they need not occupy space in a pocket. Instead, the electronic device can be worn on a wrist when not in use as a smartphone or other similar device. Additionally, the electronic devices described herein help to ensure that the electronic device does not get lost when not in use in the handheld mode. By attaching the electronic device to a wrist, it is less likely to be inadvertently dropped, lost, or damaged.

Another advantage offered by embodiments of the disclosure is that when the electronic device is transitioned to the wearable mode, in some configurations it can help a user "disconnect" from their device by concealing the visible display. Some embodiments of the disclosure allow the electronic device to be worn in a "jewelry" orientation where the display is not visible, thereby subtly helping prevent a user from constantly checking the device for updates and notifications.

In one or more embodiments, the electronic device comprises a first device housing and a second device housing that is slidable relative to the first device housing. A flexible display spans a first major surface of the electronic device. A strap spans a second major surface of the electronic device, with a first end of the strap coupled to the first device housing and a second end of the strap coupled to the second device housing.

In one or more embodiments, sliding the first device housing relative to the second device housing transitions the electronic device between a wearable and a handheld mode of operation. In one or more embodiments, sliding the first device housing relative to the second device housing changes a perimeter of an arm insertion aperture defined by the strap, the first device housing and the second device housing.

In another embodiment, an electronic device comprises a first device housing and a second device housing that is slidable relative to the first device housing. The electronic device includes a flexible display spanning a first major surface of the electronic device. A first coupler is attached to a first device housing minor face, while a second coupler is attached to a second device housing minor face.

In one or more embodiments, the first device housing and the second device housing are manufactured from a flexible material such that each can be deformed sufficiently to allow the first coupler to attach to the second coupler with the first device housing and second device housing defining a loop that can be positioned about a wrist. Where, for example, the first coupler and the second coupler are configured as magnets, this allows the electronic device to be wrapped around a wrist when not used in a handheld mode of operation.

In some embodiments, an electronic device comprises a device housing defining a component chamber having one or more of an energy storage device or one or more circuit components carried by a substrate situated therein and a deformable device housing arm extending distally from a side of the component chamber. In one or more embodiments, a strap is coupled to, and extends distally away from, a terminal edge of the deformable device housing arm.

In one or more embodiments, a first coupler is coupled to an end of the strap. A second coupler and a third coupler are situated on the device housing at different places. In one or more embodiments, the first coupler is selectively attachable to, and detachable from, either the second coupler or the third coupler. This multi-coupler coupling capability allows the strap to be positioned such that it abuts the device housing when the electronic device is being used in a handheld mode but freed from the device housing when being used in a wearable mode.

Some embodiments of the disclosure provide an electronic device that includes at least a first device housing and a second device housing. In one or more embodiments, the first device housing is configured to slide relative to the second device housing. Illustrating by example, in one explanatory embodiment, the first device housing slides into and out of the second device housing to change an overall length of the sliding electronic device. In other embodiments, the second device housing can slide into and out of the first device housing to achieve the same result. Accordingly, in one or more embodiments a sliding electronic device includes a first device housing and a second device housing that slide relative to each other to transition between a closed position, an open position, and a plurality of partially open positions therebetween.

In one or more embodiments, a flexible display is coupled to the first device housing and the second device housing. The flexible display engages a rotor in one or both device housings. When the first device housing and second device housing slide relative to each other, the flexible display wraps around the rotor to extend further from, or back into, the device housing in which the rotor(s) is/are situated.

In one or more embodiments, the rotor not only facilitates the perceived "extension" of the flexible display that occurs during an opening operation, but also works to improve the reliability and usability of the flexible display. This is true because the rotor defines a service loop about which the flexible display curves. The service loop prevents the flexible display from being damaged or developing memory in the folded position when the electronic device is in the closed position.

In one or more embodiments, a "rollable" electronic device includes a strap that adjusts to be worn around wrist. In other embodiments, the electronic device includes a foldable display that flexes. The foldable display, in combination with a strap, can be morphed to form a circular loop that enables the user to wear it around wrist.

In one or more embodiments, an electronic device includes a rollable display that extends, but also flexes, to improve wearability around wrist. In one or more embodiments, electronics situated within the electronic device are offset and not stacked directly beneath a center of the display.

In one or more embodiments, when the electronic device slides closed, a flexible strap attached thereto allows for the electronic device to be worn as a watch. In one or more embodiments, the flexible strap can be detached from the device housing to reduce the overall thickness of the electronic device (where desired). When detached, in one or more embodiments the flexible strap can be worn around the wrist as jewelry. In one or more embodiments, the strap can wrap in an orientation perpendicular to the display to control device width and display length.

In one or more embodiments, the flexible strap is replaceable for various wrist sizes and customer cosmetic preferences. In one or more embodiments, the display of the electronic device is positioned in an off-center orientation, thereby allowing for the flexible strap to close the electronic device when in the wearable device orientation. This can fill the height gap when the electronic device is in the handheld mode of operation.

In some embodiments, no strap is included. Instead, the first device housing and second device housing are manufactured from flexible material such that each can be deformed. A first coupler is attached to a first device housing minor face, while a second coupler is attached to a second device housing minor face. Accordingly, the electronic device can be wrapped around the wrist with the first coupler and the second coupler attaching to retain the electronic device around the wrist. Such an electronic device can be positioned in a watch orientation, with the display facing outward, or in a jewelry orientation with the display facing inward. Where the electronic device includes a first device housing that is slidable relative to the second device housing, sliding the device housings relative to each other allows for customizing the length of the electronic device so it will fit different wrist sizes.

Turning now to FIG. 1, illustrated therein is one explanatory electronic device 100 configured in accordance with one or more embodiments of the disclosure. The electronic device 100 of FIG. 1 is a portable electronic device. For illustrative purposes, the electronic device 100 is shown as a smartphone.

The electronic device 100 includes a first device housing 101 and a second device housing 102. In one or more embodiments, the first device housing 101 slides relative to the second device housing 102. In the illustrative embodiment of FIG. 1, the first device housing 101 can selectively slide into, and out of, the second device housing 102. However, in other embodiments the opposite will be true, with the second device housing 102 being selectively slidable into and out of the first device housing 101.

In one or more embodiments, one of the first device housing 101 or second device housing 102 includes rails that couple to tracks in the other of the first device housing 101 or the second device housing 102. For instance, the first device housing 101 can have rails that couple to tracks in the second device housing 102. In another embodiment, the first device housing 101 may have a rail and a track, with the second device housing 102 having a complementary rail and track that engage the rail and track of the first device housing 101 to facilitate the sliding operation. Other techniques that allow the first device housing 101 and the second device housing 102 to slide relative to each other between a closed position (shown below in FIG. 3) and the open position of FIG. 1 will be obvious to those of ordinary skill in the art having the benefit of this disclosure.

In one or more embodiments the first device housing 101 and the second device housing 102 are manufactured from a rigid material such as a rigid thermoplastic, metal, or composite material, although other materials can be used. In other embodiments, one or both of the first device housing 101 and/or the second device housing 102 are flexible. Illustrating by example, the first device housing 101 and/or second device housing 102 may be manufactured from a malleable, bendable, or physically deformable material such as a flexible thermoplastic, flexible composite material, flexible fiber material, flexible metal, organic or inorganic textile or polymer material, or other materials. Where either the first device housing 101 or second device housing 102 is a deformable housing, it can be manufactured from a single flexible housing member or from multiple flexible housing members. In other embodiments, the second device housing 1002 could be a composite of multiple components. Still other constructs will be obvious to those of ordinary skill in the art having the benefit of this disclosure.

In the illustrative embodiment of FIG. 1, the electronic device 100 includes a single sliding mechanism where the first device housing 101 slides relative to the second device housing 102. However, in other embodiments two or more sliding mechanisms can be incorporated into the electronic device 100 to allow it to slide at multiple locations, such as in a telescoping configuration.

This illustrative electronic device 100 of FIG. 1 includes a display 103. The display 103 can optionally be touch-sensitive. Users can deliver user input to the display 103 of such an embodiment by delivering touch input from a finger, stylus, or other objects disposed proximately with the display 103.

In one or more embodiments the flexible display 104 may be formed from multiple layers of flexible material such as flexible sheets of polymer or other materials. In this illustrative embodiment, the flexible display 104 is fixedly coupled to the first device housing 101 and extends into the second device housing 102 and around the display roller mechanism 105. The flexible display 104 spans the engagement line at which the first device housing 101 slides into, and out of, the second device housing 102 in this illustrative embodiment.

Features can be incorporated into the first device housing 101 and/or the second device housing 102. Examples of such features include a camera or an optional speaker port. A user interface component, which may be a button, fingerprint sensor, or touch sensitive surface, can also be disposed along the first device housing 101 or second device housing 102. In other embodiments, these features may be omitted.

A block diagram schematic 106 of the electronic device 100 is also shown in FIG. 1. The block diagram schematic 106 includes one or more electronic components that can be coupled to a printed circuit board assembly disposed within either or both of the first device housing 101 or the second device housing 102 of the electronic device 100. The components of the block diagram schematic 106 can be electrically coupled together by conductors or a bus disposed along one or more printed circuit boards. For example, some components of the block diagram schematic 106 can be configured as a first electronic circuit fixedly situated within the first device housing 101, while other components of the block diagram schematic 106 can be configured as a second electronic circuit fixedly situated within the second device housing 102. A flexible substrate can then extend from the first electronic circuit in the first device housing 101 to the second electronic circuit in the second device housing 102 to electrically couple the first electronic circuit to the second electronic circuit.

In one or more embodiments, the electronic device 100 comprises an energy storage device 107 and one or more circuit components 108 carried by a substrate. The one or more circuit components 108 are configured to operate the flexible display 104 and other components of the electronic device 100. In one or more embodiments, the energy storage device 107 and the substrate carrying the one or more circuit components 108 are situated in an off-center alignment relative to the flexible display 104.

In one or more embodiments, the electronic device 100 includes one or more processors 110. In one embodiment, the one or more processors 110 can include an application processor and, optionally, one or more auxiliary processors. One or both of the application processor or the auxiliary processor(s) can include one or more processors. One or both of the application processor or the auxiliary processor(s) can be a microprocessor, a group of processing components, one or more ASICs, programmable logic, or other type of processing device.

The application processor and the auxiliary processor(s) can be operable with the various components of the electronic device 100. Each of the application processor and the auxiliary processor(s) can be configured to process and execute executable software code to perform the various functions of the electronic device 100. A storage device, such as memory 111, can optionally store the executable software code used by the one or more processors 110 during operation.

In this illustrative embodiment, the electronic device 100 also includes a communication circuit 112 that can be configured for wired or wireless communication with one or more other devices or networks. The networks can include a wide area network, a local area network, and/or personal area network. The communication circuit 112 may also utilize wireless technology for communication, such as, but are not limited to, peer-to-peer or ad hoc communications such as HomeRF, Bluetooth and IEEE 802.11, and other forms of wireless communication such as infrared technology. The communication circuit 112 can include wireless communication circuitry, one of a receiver, a transmitter, or transceiver, and one or more antennas 113.

In one embodiment, the one or more processors 110 can be responsible for performing the primary functions of the electronic device 100. For example, in one embodiment the one or more processors 110 comprise one or more circuits operable with one or more user interface devices, which can include the display 103, to present, images, video, or other presentation information to a user. The executable software code used by the one or more processors 110 can be configured as one or more modules 114 that are operable with the one or more processors 110. Such modules 114 can store instructions, control algorithms, logic steps, and so forth.

In one embodiment, the one or more processors 110 are responsible for running the operating system environment of the electronic device 100. The operating system environment can include a kernel and one or more drivers, and an application service layer, and an application layer. The operating system environment can be configured as executable code operating on one or more processors or control circuits of the electronic device 100. The application layer can be responsible for executing application service modules. The application service modules may support one or more applications 109 or "apps." The applications of the application layer can be configured as clients of the application service layer to communicate with services through application program interfaces (APIs), messages, events, or other inter-process communication interfaces. Where auxiliary processors are used, they can be used to execute input/output functions, actuate user feedback devices, and so forth.

In one embodiment, the one or more processors 110 may generate commands or execute control operations based on information received from the sensors 115 of the electronic device 100. The one or more processors 110 may also generate commands or execute control operations based upon information received from a combination of the one or more sensors 115, the flexible display 104, and/or the other input devices such as the user interface component. Alternatively, the one or more processors 110 can generate commands or execute control operations based upon information received from the one or more sensors 115 or the flexible display 104 alone. Moreover, the one or more processors 110 may process the received information alone or in combination with other data, such as the information stored in the memory 111.

The one or more sensors 115 may include a microphone, an earpiece speaker, a second loudspeaker, and a user interface component such as a button or touch-sensitive surface. The one or more other sensors 115 may also include key selection sensors, proximity sensors, a touch pad sensor, a touch screen sensor, a capacitive touch sensor, and one or more switches. Touch sensors may be used to indicate whether any of the user actuation targets present on the display 103 are being actuated. Alternatively, touch sensors disposed in the electronic device 100 can be used to determine whether the electronic device 100 is being touched at side edges or major faces of the first device housing 101 or the second device housing 102. The touch sensors can include surface and/or housing capacitive sensors in one embodiment. The other sensors 115 can also include audio sensors and video sensors.

The other sensors 115 can also include motion detectors, such as one or more accelerometers or gyroscopes. For example, an accelerometer may be embedded in the electronic circuitry of the electronic device 100 to show vertical orientation, constant tilt and/or whether the electronic device 100 is stationary. A gyroscope can be used in a similar fashion.

Other components 116 operable with the one or more processors 110 can include output components such as video outputs, audio outputs, and/or mechanical outputs. Examples of output components include audio outputs such as speaker port, earpiece speaker, or other alarms and/or buzzers and/or a mechanical output component such as vibrating or motion-based mechanisms. Still other components will be obvious to those of ordinary skill in the art having the benefit of this disclosure.

In one or more embodiments, a strap attachment chassis 117 is provided to allow a strap 118, which may be flexible, to be attached to one or both of the first device housing 101 and/or second device housing 102. In one or more embodiments, the strap attachment chassis 117 includes clasps, magnets, latches, hooks, loops, or other mechanical features that allow the strap 118 to be selectively attached to, or detached from, one or both of the first device housing 101 and/or second device housing 102.

It is to be understood that FIG. 1 is provided for illustrative purposes only and for illustrating components of one electronic device 100 in accordance with embodiments of the disclosure and is not intended to be a complete schematic diagram of the various components required for an electronic device. Therefore, other electronic devices in accordance with embodiments of the disclosure may include various other components not shown in FIG. 1 or may include a combination of two or more components or a division of a particular component into two or more separate components, and still be within the scope of the present disclosure.

Figure 2:
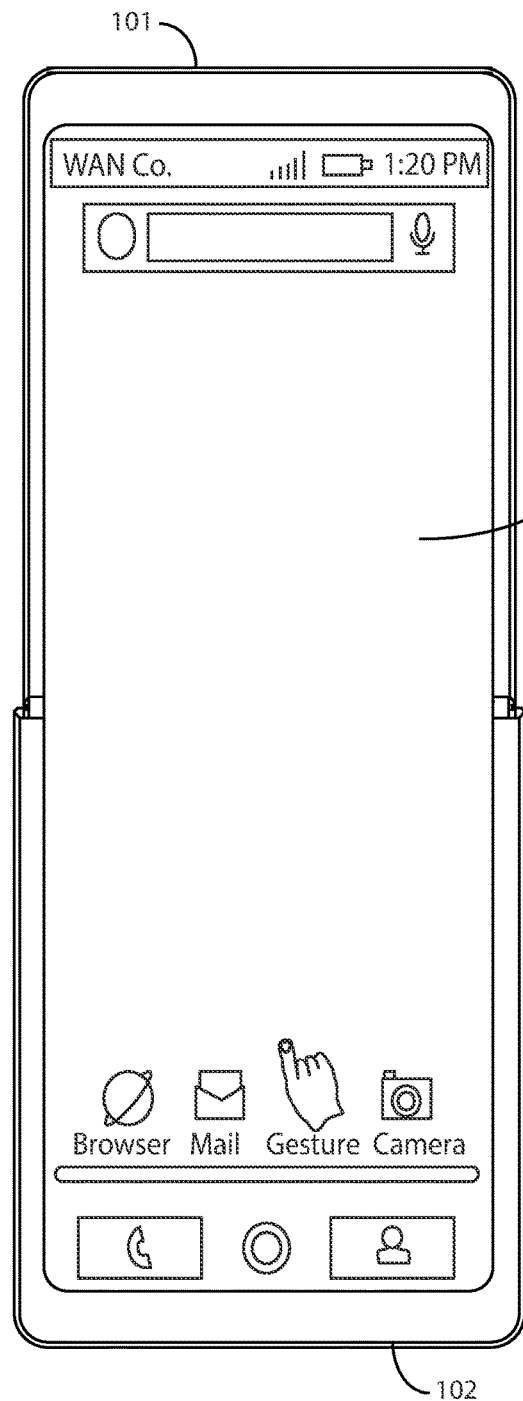
FIG. 2 illustrates one explanatory sliding electronic device in an open position.

Turning now to FIG. 2, illustrated therein is the electronic device 100 in an open position 200. The open position 200 is also known as a handheld mode or handheld operating configuration.

In the axially displaced open position 200, the first device housing 101 slides out of the second device housing 102, thereby revealing the flexible display 104. In such a configuration, front surfaces of the first device housing 101 and the second device housing 102 effectively define a plane. Since this illustrative embodiment includes a flexible display 104, the flexible display 104 has been elongated into a flat position. This transitions the electronic device 100 into a handheld mode of operation.

Figure 3:
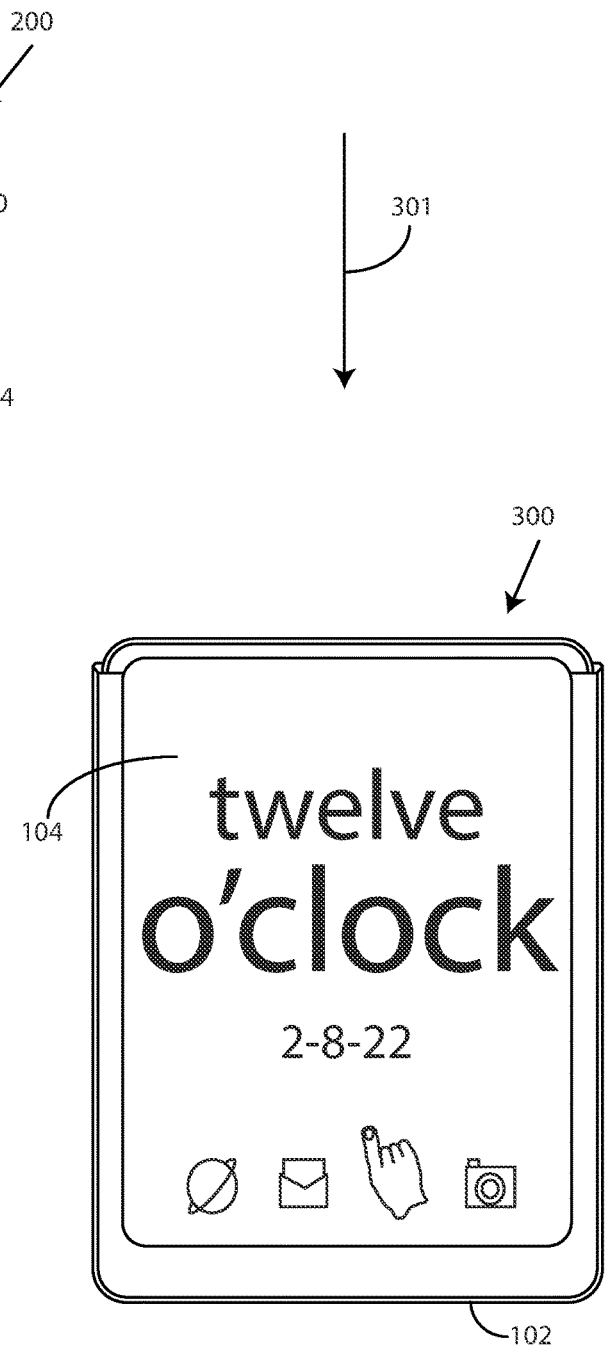
FIG. 3 illustrates one explanatory sliding electronic device in a closed position.

Turning now to FIG. 3, illustrated therein is the electronic device 100 in a closed state. The closed state is also known as a wearable configuration or wearable mode of operation.

In this state, the first device housing 101 slides 301 into the second device housing 102 toward the second device housing 102 to a closed position 300. This causes the overall length of the electronic device 100 to get shorter. Additionally, the flexible display 104 inserts into the second device housing 102 by passing around the display roller mechanism (105) and becoming concealed within the second device housing 102. This transitions the electronic device 100 into a wearable mode of operation. When the electronic device 100 opens again, the concealed portions of the flexible display 104 are again revealed.

In some embodiments, features can be included to further retain the electronic device 100 in the closed position 300. Illustrating by example, in another embodiment, a mechanical latch can be included to retain the first device housing 101 and the second device housing 102 in the closed position 300. In still another embodiment, magnets can be incorporated into the first device housing 101 and the second device housing 102. For instance, magnets can be placed in the first device housing 101 and the second device housing 102 to retain the first device housing 101 and the second device housing 102 in the closed position 300.

In still other embodiments, frictional elements can be incorporated into the mechanical interface existing between the first device housing 101 and the second device housing 102 to retain the first device housing 101 and the second device housing 102 in a particular position. A stator motor could be integrated into electronic device 100 to drive the first device housing 101 and second device housing 102 together and apart as well.

Figure 4:
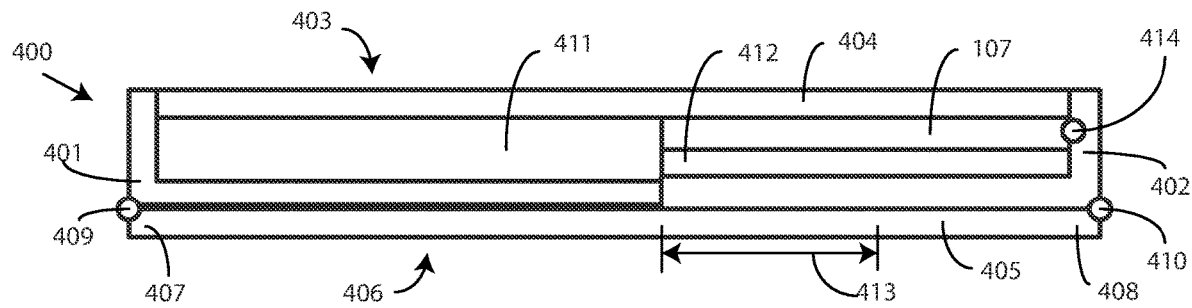
FIG. 4 illustrates a sectional side view of one explanatory electronic device in accordance with one or more embodiments of the disclosure in a first mechanical configuration.

Turning now to FIG. 4, illustrated therein is a sectional view of one explanatory electronic device 400 configured in accordance with one or more embodiments of the disclosure. In FIG. 4, the electronic device is shown in a handheld configuration.

The electronic device includes a first device housing 401 and a second device housing 402 that is slidable relative to the first device housing. A flexible display 404 spans a first major surface 403 of the electronic device 400. A strap 405 spans a second major surface 406 of the electronic device.

In one or more embodiments, the strap 405 includes a first end 407 coupled to the first device housing 401. The strap 405 also includes a second end 408 coupled to the second device housing 402. The first end 407 and the second end 408 of the strap 405 could be perdurably coupled to the first device housing 401 and the second device housing 402, respectively, in some embodiments. However, in other embodiments the first end 407 and the second end 408 of the strap 405 are configured to be attachable to, or detachable from, the first device housing 401 and the second device housing 402, respectively.

Illustrating by example, the strap 405 of FIG. 4 includes a first fastener 409 and a second fastener 410 allowing the first end 407 and the second end 408 to selectively attach to, and detach from, the first device housing 401 and the second device housing 402, respectively. The first fastener 409 is coupled to the first end 407 of the strap 405, while the second fastener 410 is coupled to the second end 408 of the strap 405.

Figure 6:
FIG. 6 illustrates a sectional side view of the electronic device of FIG. 4 with a strap component detached from the device housing.
Figure 7:
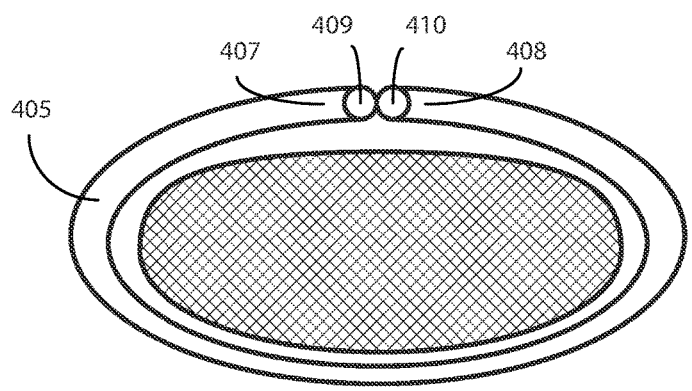
FIG. 7 illustrates the strap component detached from the electronic device of FIG. 6 in a wearable configuration.

As will be shown below with reference to FIGS. 6-7, the first device housing 401 includes a third fastener that is selectively attachable to, or detachable from, the first fastener 409 coupled to the first end 407 of the strap 405. Similarly, the second device housing 402 includes a fourth fastener that is selectively attachable to, or detachable from, the second fastener 410 coupled to the second end 408 of the strap 405. In one or more embodiments, these fasteners are pivotable such that the first fastener 409 of the strap 405 can pivot about the first device housing 401 when coupled to the third fastener of the first device housing 401. Similarly, the second fastener 410 of the strap 405 can pivot about the second device housing 402 when coupled to the fourth fastener of the second device housing 402.

In one or more embodiments, one or both of the first device housing 401 and/or the second device housing 402 defines a component chamber 411. In the illustrative embodiment of FIG. 4, the component chamber 411 is situated between sides of the first device housing 401 and second device housing 402, the bottom surfaces of the first device housing 401 and the second device housing 402, and the flexible display 404.

In the illustrative embodiment of FIG. 4, one or more circuit components (108) carried by a substrate 412 and an energy storage device 107 are situated within the component chamber 411. As shown in FIG. 4, the substrate 412 and the energy storage device 107 are situated in the second device housing 402, which means that they are situated in an off-center alignment 413 relative to the flexible display 404.

In one or more embodiments, the flexible display comprises one or more layers that are coupled or laminated together to complete the flexible display 404. In one or more embodiments, these layers comprise a flexible protective cover, a first adhesive layer, a flexible display layer, a second adhesive layer, and a flexible substrate. Other configurations of layers suitable for manufacturing the flexible display 404 will be obvious to those of ordinary skill in the art having the benefit of this disclosure.

Beginning from the top of the layer stack, in one or more embodiments the flexible protective cover comprises an optically transparent substrate. In one or more embodiments the flexible protective cover may be manufactured from an optically transparent material such a thin film sheet of a thermoplastic material. Illustrating by example, in one embodiment the flexible protective cover is manufactured from a layer of optically transparent polyamide. In another embodiment, the flexible protective cover is manufactured from a layer of optically transparent polycarbonate. Other materials suitable for manufacturing the flexible protective cover will be obvious to those of ordinary skill in the art having the benefit of this disclosure. Illustrating by example, in other embodiments the housing could be manufactured from glass.

In one or more embodiments the flexible protective cover functions as a fascia by defining a cover for the flexible display layer. In one or more embodiments the flexible protective cover is optically transparent, in that light can pass through the flexible protective cover so that objects behind the flexible protective cover can be distinctly seen. The flexible protective cover may optionally include an ultra-violet barrier. Such a barrier can be useful in improving the visibility of flexible display layer in one or more embodiments.

Beneath the flexible protective cover is a first adhesive layer. In one or more embodiments, the first adhesive layer comprises an optically transparent adhesive. The optically transparent adhesive can be applied to two sides of a thin, optically transparent substrate such that the first adhesive layer functions as an optically transparent layer having optically transparent adhesive on both sides. This optically transparent version of "double-sided tape" can then be spooled and applied between the flexible protective cover and the flexible display layer to couple the two together.

In other embodiments the first adhesive layer will instead be applied between the flexible protective cover and the flexible display layer as an optically transparent liquid, gel, as a homogeneous adhesive layer, or in the form of another medium. Where so configured, the first adhesive layer can optionally be cured by heat, ultraviolet light, or other techniques. Other examples of materials suitable for use as the first adhesive layer will be obvious to those of ordinary skill in the art having the benefit of this disclosure. In one or more embodiments, the first adhesive layer mechanically couples the flexible display layer to the flexible protective cover.

In one or more embodiments, the flexible display layer is situated between the flexible substrate and the flexible protective cover. In other embodiments, a layer above the flexible display layer can be configured with enough stiffness to make the flexible substrate unnecessary. For example, in an embodiment where the flexible protective cover is configured with enough stiffness to retain the flexible display in the proper shape, the flexible substrate may be omitted.

The flexible display layer can optionally be touch-sensitive. In one or more embodiments, the flexible display layer is configured as an organic light emitting diode (OLED) display layer coupled to the flexible substrate, which allows the flexible display layer to bend in accordance with various bending radii.

In one or more embodiments the flexible display layer may be formed from multiple layers of flexible material such as flexible sheets of polymer or other materials. Illustrating by example, the flexible display layer can include a layer of optically pellucid electrical conductors, a polarizer layer, one or more optically transparent substrates, and layers of electronic control circuitry such as thin film transistors to actuate pixels and one or more capacitors for energy storage.

In one or more embodiments, to be touch sensitive the flexible display layer includes a layer including one or more optically transparent electrodes. In one or more embodiments, the flexible display layer includes an organic light emitting diode layer configured to images and other information to a user. The organic light emitting diode layer can include one or more pixel structures arranged in an array, with each pixel structure comprising a plurality of electroluminescent elements such as organic light emitting diodes. These various layers can be coupled to one or more optically transparent substrates of the flexible display layer. Other layers suitable for inclusion with the flexible display layer will be obvious to those of ordinary skill in the art having the benefit of this disclosure.

In one or more embodiments, the flexible display layer is coupled to the flexible substrate by a second adhesive layer. In one or more embodiments, to simplify manufacture, the second adhesive layer is identical to the first adhesive layer and comprises an optically transparent adhesive. However, since the second adhesive layer is coupled between the flexible display layer and the flexible substrate, i.e., under the flexible display layer, an optically transparent adhesive is not a requirement. The second adhesive layer could be partially optically transparent or not optically transparent at all in other embodiments.

Regardless of whether the second adhesive layer is optically transparent, in one or more embodiments the adhesive of the second adhesive layer is applied to two sides of a thin, flexible substrate. This extremely thin version of "double-sided tape" can then be spooled and applied between the flexible display layer and the flexible substrate to couple the two together.

In other embodiments, as with the first adhesive layer, the second adhesive layer will instead be applied between the flexible display layer and the foldable substrate as a liquid, gel, as a homogeneous layer, or in the form of another medium. Where so configured, the second adhesive layer can optionally be cured by heat, ultraviolet light, or other techniques. Other examples of materials suitable for use as the second adhesive layer will be obvious to those of ordinary skill in the art having the benefit of this disclosure.

In one or more embodiments, the flexible display comprises a flexible substrate. In one or more embodiments the flexible substrate is coupled to the flexible display layer and defines a mechanical support for the flexible display layer due to the fact that the flexible substrate is the stiffest layer of the flexible display 404. In one or more embodiments the flexible substrate is manufactured from stainless steel. In another embodiment, the flexible substrate is manufactured from a flexible plastic. Other materials from which the flexible substrate can be manufactured will be obvious to those of ordinary skill in the art having the benefit of this disclosure.

Embodiments of the disclosure contemplate that some of the layers comprising the flexible display 404 are stiffer than others. Similarly, other layers of the flexible display 404 are softer than others. For example, where the flexible substrate is manufactured from stainless steel, this layer is stiffer than either the first adhesive layer or the second adhesive layer. In one or more embodiments, the stainless steel is stiffer than the flexible display layer as well. In one or more embodiments, the flexible substrate is the stiffest layer in the flexible display 404 while the first adhesive layer and the second adhesive layer are the softest layers of the flexible display 404. The flexible protective cover and the flexible display layer have a stiffness that falls between that of the flexible substrate and the adhesive layers in one or more embodiments.

In one or more embodiments, the various layers of the flexible display 404 are laminated together in a substantially planar configuration. Said differently, in one or more embodiments the flexible substrate is configured as a substantially planar substrate. The second adhesive layer can be attached to this substantially planar substrate, with the flexible display layer then attached to the second adhesive layer. The first adhesive layer can be attached to the flexible display layer, with the flexible protective cover attached to the first adhesive layer. To ensure proper coupling, the resulting flexible display layer can be cured, such as in an autoclave at a predefined temperature for a predefined duration. Where employed, such curing allows any air bubbles or other imperfections in the various layers to be corrected. In one or more embodiments, since the flexible substrate is configured as a substantially planar substrate, the resulting flexible display 404 is substantially planar as well.

In one or more embodiments, the flexible display 404 wraps around a display roller mechanism when the first device housing 401 slides relative to the second device housing 402. In this illustrative embodiment, the display roller mechanism includes a rotor 414 about which the flexible display 404 wraps when the first device housing 401 slides relative to the second device housing 402.

Rotation of the rotor 414 causes a linear translation of the flexible display 404 across the first major surface 403 of the electronic device 400 by drawing the flexible display 404 around the rotor 414. In one or more embodiments, the rotor 414 is positioned within a curvilinear section of the flexible display 404, with the flexible display 404 passing around the rotor 414 when the first device housing 401 slides relative to the second device housing 402.

The electronic device 400 is shown in a handheld configuration in FIG. 4. Due to the pivotability of the first fastener 409 and the second fastener 410 of the strap 405 about the third fastener and the fourth fastener of the first device housing 401 and second device housing 402, the first end 407 of the strap 405 is pivotally coupled to the first device housing 401 and the second end 408 of the strap 405 is pivotally coupled to the second device housing 402.

Since the first device housing 401 is slid to a maximally extended position relative to the second device housing 402 in FIG. 4, the strap 405 becomes straightened and abuts the second major surface 406 of the electronic device 400. Said differently, the sliding operation that results in the configuration of FIG. 4 with the first device housing 401 slid away from the second device housing 402 to a maximally extended position causes the strap 405 to abut one or both of the first device housing 401 and/or the second device housing 402. Here, the strap 405 abuts both the first device housing 401 and the second device housing 402.

Figure 5:
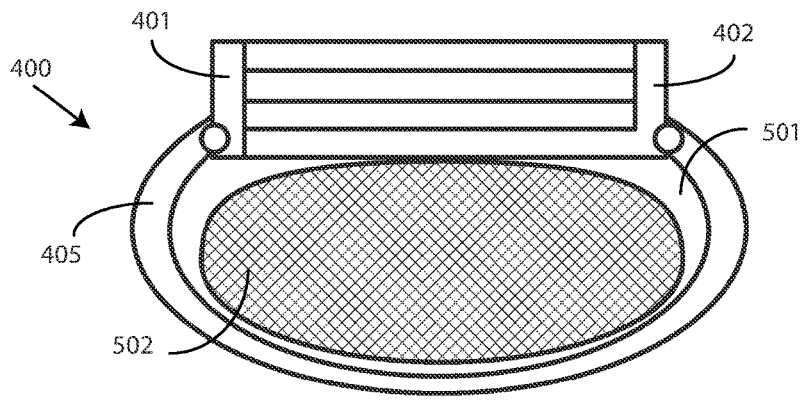
FIG. 5 illustrates a sectional side view of the electronic device of FIG. 4 in a second mechanical configuration that is wearable.

Turning now to FIG. 5, the electronic device 400 of FIG. 4 has been transitioned to a wearable configuration. Specifically, the first device housing 401 has been slid toward the second device housing 402 to a minimally extended position. This causes slack to be introduced in the strap 405 such that the strap 405, the first device housing 401, and the second device housing 402 define an arm insertion aperture 501.

In one or more embodiments, sliding the first device housing 401 relative to the second device housing 402 between the maximally extended position and the minimally extended position changes a perimeter length of the arm insertion aperture 501 defined by the strap 405, the first device housing 401, and the second device housing 402. This allows a person's arm 502 to be inserted into the arm insertion aperture 501 so that the electronic device 400 can be worn as a wristwatch. When this sliding occurs, the flexible display 404 wraps around the rotor (414), thereby shortening the length of the flexible display 404 spanning the first major surface 403 of the electronic device 400.

As noted above, in one or more embodiments the strap 405 is selectively detachable from the electronic device 400. Turning now to FIG. 6, illustrated therein is the electronic device 400 with the strap (405) detached therefrom. This reveals the third fastener 609 attached to the first device housing 401 and the fourth fastener 610 attached to the second device housing 402.

In one or more embodiments, the fasteners of the strap are not only attachable to the fasteners of the first device housing 401 and the second device housing 402 but are also attachable to themselves. Said differently, in one or more embodiments the first fastener (409) attached to the first end (407) of the strap (405) is selectively attachable to, and detachable from, both the third fastener 609 attached to the first device housing 401 and the second fastener (410) attached to the second end (408) of the strap (405). Similarly, in one or more embodiments the second fastener (410) attached to the second end (408) of the strap (405) is selectively attachable to, and detachable from, both the fourth fastener 610 attached to the second device housing 402 and to the first fastener (409) attached to the first end (407) of the strap (405). As shown in FIG. 7, this allows the strap 405 to be worn as a bracelet in a jewelry configuration when the first fastener 409 attached to the first end 407 of the strap is coupled to the second fastener 410 attached to the second end 408 of the strap 405.

Figure 8:
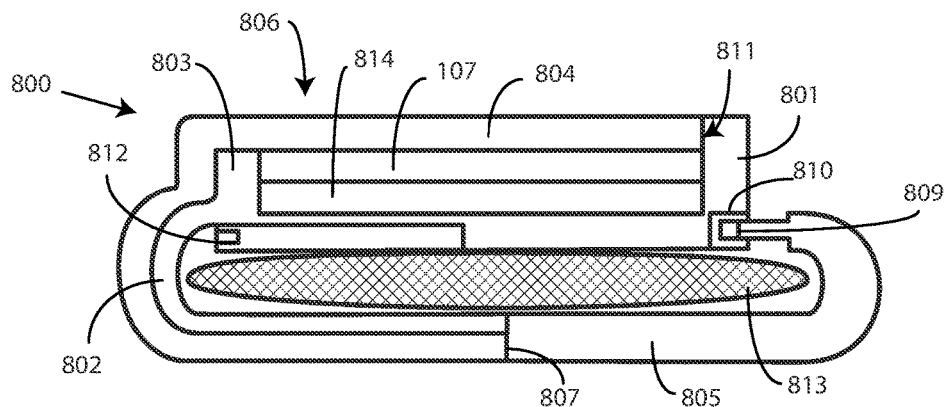
FIG. 8 illustrates a sectional side view of another explanatory electronic device in accordance with one or more embodiments of the disclosure in a first mechanical configuration that is wearable.

Turning now to FIG. 8, illustrated therein is another electronic device 800 configured in accordance with one or more embodiments of the disclosure. In FIG. 8, the electronic device 800 is shown in a wearable configuration.

The electronic device 800 of FIG. 8 includes a device housing 801 defining a component chamber 811. An energy storage device 107 and one or more circuit components (108) carried by a substrate 814 are situated within the component chamber 811.

In this embodiment, some or all of the device housing 801 are manufactured from a bendable material. Illustrating by example, the device housing 801 can be manufactured from a malleable, bendable, or physically deformable material such as a flexible thermoplastic, flexible composite material, flexible fiber material, flexible metal, organic or inorganic textile or polymer material, or other materials.

In the illustrative embodiment of FIG. 8, the device housing 801 comprises a deformable device housing arm 802 extending distally from a side 803 of the component chamber 811. As before, a flexible display 804 spans a major surface 806 of the electronic device 800. The flexible display 804 also spans one side of the deformable device housing arm 802. In this embodiment, the flexible display 804 spans the entirety of one side of the deformable device housing arm 802.

A strap 805 is coupled to, and extends terminally away from, a terminal edge 807 of the deformable device housing arm 802. The strap 805 of FIG. 8 includes a single coupler 809 situated at a terminal end of the strap 805. The single coupler 809 allows the terminal end of the strap 805 to selectively attach to, and detach from, as second coupler 810 situated at a first location on the device housing 801 or a third coupler 812 situated at a second location of the device housing 801 that is different from the first location. In the illustrative embodiment of FIG. 8, the second coupler 810 and the third coupler 812 are situated on the device housing 801 in different places. The first coupler 809 is selectively attachable to, and detachable from, either the second coupler 810 or the third coupler 812 in one or more embodiments.

As shown in FIG. 8, the electronic device 800 is in a wearable configuration. This means that the component chamber 811, the deformable device housing arm 802, and the strap 805 define a loop when the deformable device housing arm 802 is deformed into the curvilinear shape of FIG. 8 and the first coupler 809 is attached to the second coupler 810 of the device housing 801.

In one or more embodiments, the first coupler 809 and the second coupler 810 comprise magnetic couplers. Thus, when the electronic device 800 is in the wearable configuration of FIG. 8, the first coupler 809 attaches to the second coupler 810 magnetically to define the loop into which a wearer's arm 813 can be inserted.

In this illustrative embodiment, the third coupler 812 allows attachment of the first coupler thereto when the electronic device 800 is transitioned to the handheld configuration. In one or more embodiments, this occurs when the deformable device housing arm 802 is extended into a linear configuration extending linearly away from the component chamber 811. This is shown below in FIG. 9A.

In the wearable configuration of FIG. 8, the flexible display 804 extends from a first side wall of the component chamber 811 across the top of the component chamber 811, across a second side wall of the component chamber 811, and along the deformable device housing arm 802 to the terminal edge 807 of the deformable device housing arm 802. In so doing, the flexible display 804 is positioned in an off-center location relative to the component chamber 811 with the component chamber situated under a right side of the flexible display 804 and the deformable device housing arm 802 situated under a left side of the first device housing 801. By having the strap 805 extend distally not only from the terminal edge 807 of the deformable device housing arm 802 but the terminal edge of the flexible display 804 as well, this allows the strap 805 to fill the "height gap" between the terminal edge 807 of the deformable device housing arm 802 and the terminal edge of the flexible display 804 when the electronic device 800 is transitioned to the handheld configuration of FIG. 9A.

Figure 9A:
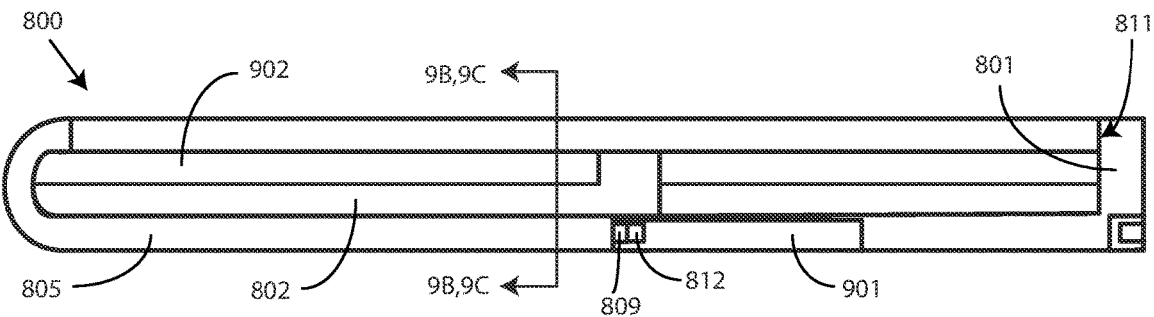
FIG. 9A illustrates a sectional side view of the electronic device of FIG. 8 in a second mechanical configuration.

Turning now to FIG. 9A, the electronic device 800 has been transitioned from the wearable configuration of FIG. 8 to the handheld configuration by bending the deformable device housing arm 802 until it extends linearly away from the second side wall of the component chamber 811. When this occurs, the first coupler 809 positioned at the end of the strap 805 can be attached to the third coupler 812 such that the strap 805 abuts the deformable device housing arm 802. Said differently, when the deformable device housing arm 802 extends linearly away from the component chamber 811 in the handheld configuration, the strap 805 abuts the when the first coupler 809 is attached to the third coupler 812. In one or more embodiments, the third coupler 812 can be moved within an adjustment chamber 901 to accommodate different strap lengths for different wrist sizes and/or user cosmetic preferences. Illustrating by example, the third coupler 812 can slide into, or out of, the device housing 801 along the adjustment chamber to allow for straps of varying lengths to still abut the device housing 801 when the electronic device 800 is in the handheld configuration.

To preclude a void being created between the flexible display 804 and the deformable device housing arm 802, in one or more embodiments a filling element 902 can situate between the flexible display 804 and the deformable device housing arm 802 when the deformable device housing arm 802 extends linearly away from the component chamber 811 of the device housing 801. This can be done in a variety of ways. Two explanatory embodiments are shown in FIGS. 9B and 9C.

Figure 9B:
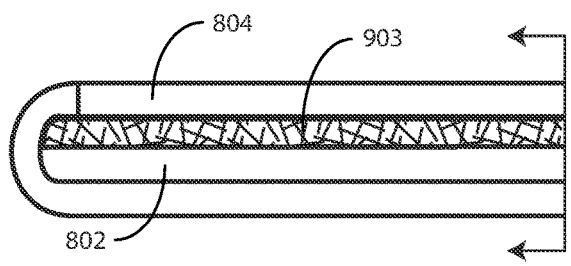
FIG. 9B illustrates a first optional configuration for portions of the electronic device of FIG. 9A.

Turning first to FIG. 9B, in this illustrative embodiment a self-organizing lattice structure 903 that is retractable into the device housing (801) serves as the filling element (902). When the deformable device housing arm 802 is extended so as to extend linearly away from the second side wall of the component chamber (811), the opening of a void between the flexible display 804 and the deformable device housing arm 802 allows the self-organizing lattice structure 903 to expand, thereby filling the void and providing mechanical support for the flexible display 804.

Figure 9C:
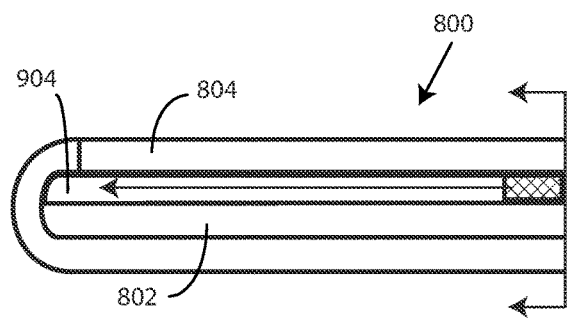
FIG. 9C illustrates a second optional configuration for portions of the electronic device of FIG. 9A.

By contrast, turning now to FIG. 9C, in this illustrative embodiment an extendable support plate 904 is retractable into, and extendable from, the device housing (801). This extendable support plate 904 functions as the filling element (902) when the electronic device 800 is transitioned to the handheld configuration. In one or more embodiments, the extendable support plate 904 extends from the second side wall of the component chamber (811) when the electronic device 800 is placed into the handheld configuration, thereby mechanically supporting the flexible display 804 and overall electronic device 800 when the deformable device housing arm 802 extends linearly away from the second side wall of the component chamber (811). Said differently, the extendable support plate 904 can eject from the device housing (801) when the deformable device housing arm 802 is transitioned to a flat state.

Figure 10:
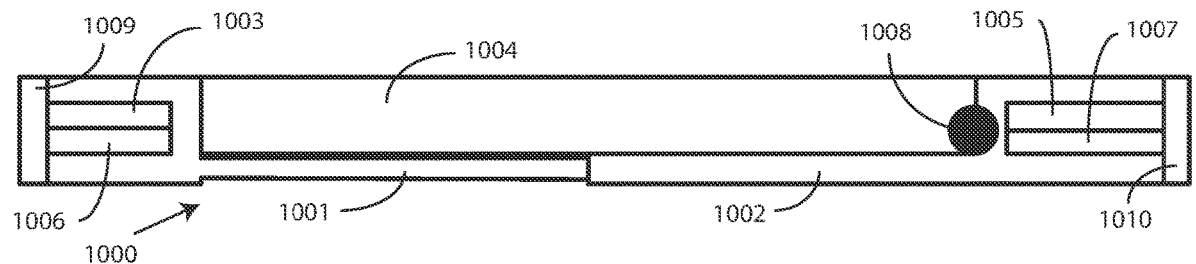
FIG. 10 illustrates a sectional view of yet another explanatory electronic device in accordance with one or more embodiments of the disclosure in a first mechanical configuration.

Turning now to FIG. 10, illustrated therein is yet another electronic device 1000 configured in accordance with one or more embodiments of the disclosure. In FIG. 10, the electronic device 1000 is shown in a handheld configuration.

The electronic device 1000 includes a first device housing 1001 and a second device housing 1002 that is slidable relative to the first device housing. A flexible display 1004 spans a majority of a first major surface of the electronic device 1000. Surfaces of the first device housing 1001 and the second device housing 1002 span the second major surface 406 of the electronic device.

In the illustrative embodiment of FIG. 10, the electronic device 1000 has a length of about 196 millimeters when the first device housing 1001 is maximally extended from the second device housing 1002. However, the length of the electronic device 1000 can be adjusted downward by sliding the first device housing 1001 into the second device housing 1002 to a length of about 141 millimeters for smaller wrists.

Unlike previous embodiments, the electronic device 1000 of FIG. 10 includes no strap. Instead, the electronic device 1000 is malleable so that it can define a strap without the need for a strap to be included. The flexible display 1004 is fabricated on a flexible plastic substrate that allows the flexible display 1004 to be flexible. When the first device housing 1001 slides relative to the second device housing 1002, the flexible display can deform around a display roller mechanism (105) as previously described, thereby changing its overall length. One example of such a display roller mechanism (105) is a rotor 1008, which works as does the one described above with reference to FIG. 4.

In this embodiment, the first device housing 1001 and the second device housing 1002 are each manufactured from a bendable material, examples of which include flexible thermoplastics, flexible composite materials, flexible fiber materials, flexible metals, or organic or inorganic textile or polymer materials. Other bendable materials will be obvious to those of ordinary skill in the art having the benefit of this disclosure.

As shown in FIG. 10, a first coupler 1009 is attached to a minor face of the first device housing 1001. Similarly, a second coupler 1010 is attached to a minor face of the second device housing 1002. In one or more embodiments, the first coupler 1009 and the second coupler 1010 each comprise magnetic couplers. The first device housing 1001 and the second device housing 1002 can be slid relative to each other to change an overall length of the electronic device 1000 to match the circumference of a user's arm. Thereafter, the first device housing 1001 and the second device housing 1002 can be deformed sufficiently to allow the first coupler 1009 to attach to the second coupler 1010. In one or more embodiments, as will be shown with reference to FIGS. 11-12 below, the electronic device 1000 defines a cylinder when the first coupler 1009 is attached to the second coupler 1010.

In one or more embodiments, both of the first device housing 1001 and the second device housing 1002 define a component chamber. In the illustrative embodiment of FIG. 10, the component chambers are situated between the couplers 1009,1010 and the flexible display 1004. In the illustrative embodiment of FIG. 10, one or more circuit components (108) are carried by a first substrate 1006 and a second substrate 1007. Additionally, the energy storage device of the electronic device 1000 has been bifurcated into a first energy storage device 1003 and a second energy storage device 1005, situated within the first component chamber and the second component chamber, respectively.

Accordingly, in this illustrative embodiment the electronic device 1000 includes two energy storage devices 1003,1005 and one or more circuit components (108) coupled to a first substrate 1006 and a second substrate 1007. A first energy storage device 1003 and a first substrate 1006 supporting one or more circuit components (108) are positioned between the first coupler 1009 and the flexible display 1004, while a second energy storage device 1005 and the second substrate 1007 supporting one or more other circuit components (108) are positioned between the second coupler 1010 and the flexible display 1004. This results in the flexible display 1004 being centrally disposed between the first energy storage device 1003 and the first substrate 1006, and the second energy storage device 1005 and the second substrate 1007, respectively.

As with the electronic device (100) of FIG. 1, features can be added to the electronic device 1000 including a charging port, speaker port, and microphone. In one or more embodiments, these features are positioned along either the first coupler 1009 or the second coupler 1010. This positioning protects the features from environmental damage when the electronic device 1000 is transitioned into the wearable configuration with the first coupler 1009 attached to the second coupler 1010 due to the fact that the mating of the first coupler 1009 and the second coupler 1010 encases the charging port, speaker port, and microphone (or other features that may be included.

Figure 11:
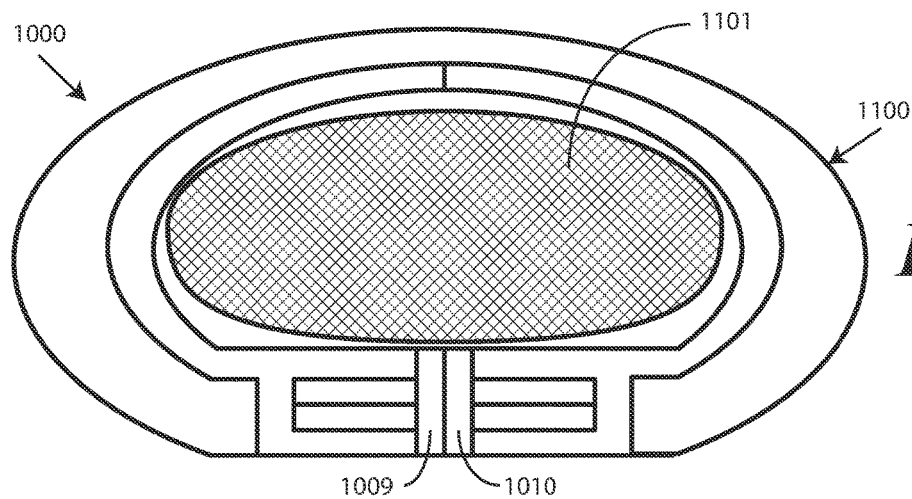
FIG. 11 illustrates a sectional side view of the electronic device of FIG. 10 in a second mechanical configuration that is wearable.

Turning now to FIG. 11, the first device housing 1001 and the second device housing 1002 can be deformed sufficiently to allow the first coupler 1009 to attach to the second coupler 1010. As shown, the electronic device 1000 defines a cylinder 1100 when the first coupler 1009 is attached to the second coupler 1010.

Figure 12:
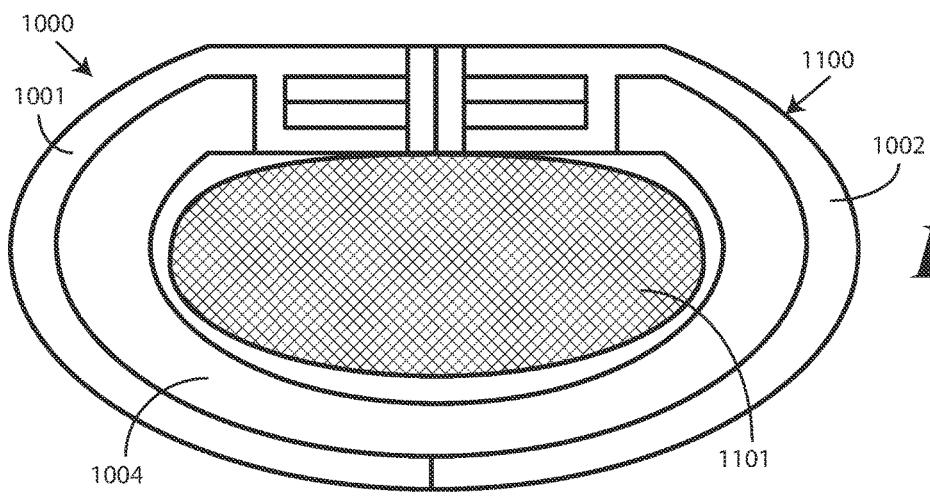
FIG. 12 illustrates a sectional side view of the electronic device of FIG. 10 in a third mechanical configuration that is wearable.

In FIG. 11, the electronic device 1000 is deformed with the flexible display 1004 defining an exterior surface of the cylinder 1100 so that it can be seen when worn around a user's arm 1101. By contrast, as shown in FIG. 12, the electronic device 1000 can be deformed with the flexible display 1004 defining an interior surface of the cylinder 1100 so that it cannot be seen when worn around a user's arm 1101. This configuration is referred to as a "jewelry configuration" due to the fact that the flexible display 1004 is hidden by the first device housing and the second device housing 1002.

By including the "morphing" housings of FIGS. 10-12, the electronic device 1000 provides ultimate portability in that it can be used in a handheld mode or worn in a watch configuration or jewelry configuration, all without the necessity of any strap. Advantageously, this design allows the electronic device 1000 to be worn on a wrist when not in use as a smartphone or other similar device. Additionally, the configuration of FIGS. 10-12 helps to ensure that the electronic device 1000 does not get lost when not in use in the handheld mode. By attaching the electronic device 1000 to a wrist, it is less likely to be inadvertently dropped, lost, or damaged.

Another advantage offered by the embodiment of FIGS. 10-12 is that when the electronic device 1000 is transitioned to the jewelry configuration of the wearable mode, it can help a user "disconnect" from the electronic device 1000 by concealing the flexible display 1004. The "jewelry" orientation of FIG. 12, where the flexible display 1004 is not visible to the user, thereby subtly helps prevent the user from constantly checking the device for updates and notifications. Moreover, wearing the electronic device 1000 in the jewelry configuration can also be advantageous in reducing the distractions stemming from notifications by minimally lighting a portion of the flexible display 1004, one example of which are the sides of the flexible display 1004 adjacent to the jewelry portion. In other embodiments, notifications can simply be precluded while the electronic device 1000 is worn in the jewelry orientation.

Figure 13:
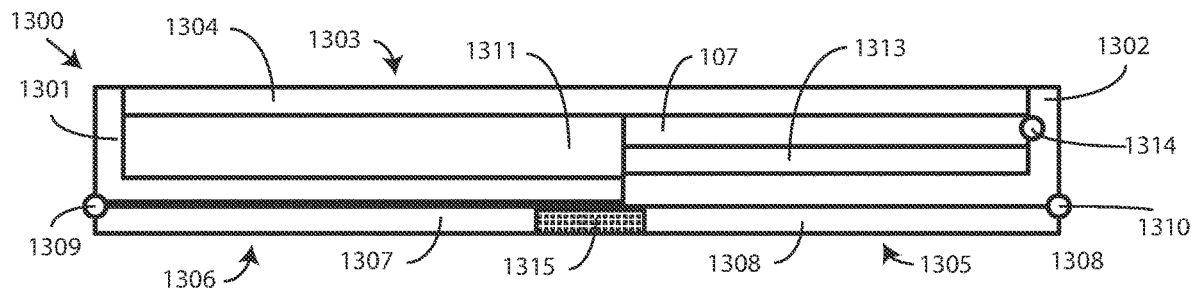
FIG. 13 illustrates a sectional view of yet another electronic device in accordance with one or more embodiments of the disclosure in a first mechanical configuration.

Turning now to FIG. 13, illustrated therein is a sectional view of yet another explanatory electronic device 1300 configured in accordance with one or more embodiments of the disclosure. In FIG. 13, the electronic device 1300 is shown in a handheld configuration.

The electronic device 1300 includes a first device housing 1301 and a second device housing 1302 that is slidable relative to the first device housing. A flexible display 1304 spans a first major surface 1303 of the electronic device 1300. A strap 1305 spans a second major surface 1306 of the electronic device. In this illustrative embodiment, the strap 1305 comprises a first strap portion 1307 coupled to the first device housing 1301, a second strap portion 1308 portion coupled to the second device housing 1302, and a clasp coupling the first strap portion 1307 to the second strap portion 1308.

In this illustrative embodiment, the first strap portion 1307 includes a first end coupled to the first device housing 1301. The second strap portion 1308 also includes a first end coupled to the second device housing 1302. The first end of the first strap portion 1307 and the second strap portion 1308 could be perdurably coupled to the first device housing 401 and the second device housing 402, respectively, in some embodiments. However, in other embodiments the first end of the first strap portion 1307 and the second strap portion 1308 are configured to be attachable to, or detachable from, the first device housing 401 and the second device housing 402, respectively.

Illustrating by example, the first strap portion 1307 of FIG. 13 includes a first fastener 1309, while the second strap portion 1308 comprises a second fastener 1310 allowing the first ends of the first strap portion 1307 and the second strap portion 1308 to selectively attach to, and detach from, the first device housing 1301 and the second device housing 1302, respectively. The first fastener 1309 is coupled to the first end of the first strap portion 1307, while the second fastener 1310 is coupled to the second strap portion 1308.

As with the electronic device (400) of FIG. 4 above, the first device housing 1301 includes a third fastener that is selectively attachable to, or detachable from, the first fastener 1309. Similarly, the second device housing 1302 includes a fourth fastener that is selectively attachable to, or detachable from, the second fastener 1310.

In one or more embodiments, these fasteners are pivotable such that the first fastener 1309 of the first strap portion 1307 can pivot about the first device housing 1301 when coupled to the third fastener of the first device housing 1301. Similarly, the second fastener 1310 of the second strap portion 1308 can pivot about the second device housing 1302 when coupled to the fourth fastener of the second device housing 1302.

In one or more embodiments, one or both of the first device housing 1301 and/or the second device housing 1302 defines a component chamber 1311. In the illustrative embodiment of FIG. 13, the component chamber 1311 is situated between sides of the first device housing 1301 and second device housing 1302, the bottom surfaces of the first device housing 1301 and the second device housing 1302, and the flexible display 1304.

In the illustrative embodiment of FIG. 13, one or more circuit components (108) carried by a substrate 1313 and an energy storage device 107 are situated within the component chamber 1311. As shown in FIG. 13, the substrate 1313 and the energy storage device 107 are situated in the second device housing 1302, which means that they are situated in an off-center alignment relative to the flexible display 1304.

In one or more embodiments, the flexible display 1304 comprises a flexible substrate. In one or more embodiments the flexible substrate is manufactured from stainless steel. In another embodiment, the flexible substrate is manufactured from a flexible plastic. In one or more embodiments, the flexible display 1304 wraps around a display roller mechanism when the first device housing 1301 slides relative to the second device housing 1302. In this illustrative embodiment, the display roller mechanism includes a rotor 1314 about which the flexible display 1304 wraps when the first device housing 1301 slides relative to the second device housing 1302.

The electronic device 1300 is shown in a handheld configuration in FIG. 13. Due to the pivotability of the first fastener 1309 and the second fastener 1310 of the strap 1305 about the third fastener and the fourth fastener of the first device housing 1301 and second device housing 1302, the first strap portion 1307 of the strap 1305 is pivotally coupled to the first device housing 1301 and the second strap portion 1308 of the strap 1305 is pivotally coupled to the second device housing 1302. Since the first device housing 1301 is slid to a maximally extended position relative to the second device housing 1302 in FIG. 13, the strap 1305 becomes straightened and abuts the second major surface 1306 of the electronic device 1300.

The embodiment of FIG. 13 differs from the embodiment of FIG. 1 in that the strap 1305 includes a clasp 1315. The clasp 1315 couples the first strap portion 1307 coupled to the first device housing 1301 to the second strap portion 1308 coupled to the second device housing 1302. Details of the clasp 1315 will be shown in more detail below with reference to FIG. 15.

Figure 14:
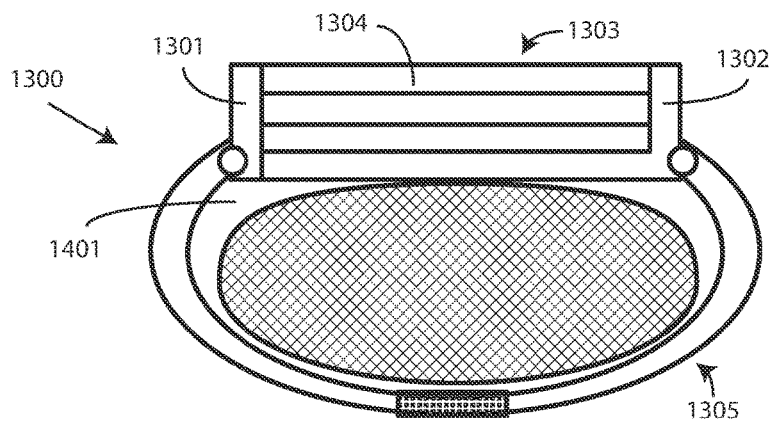
FIG. 14 illustrates a sectional view of the electronic device of FIG. 13 in a second mechanical configuration that is wearable.

Turning now to FIG. 14, the electronic device 1300 of FIG. 13 has been transitioned to a wearable configuration. Specifically, the first device housing 1301 has been slid toward the second device housing 1302 to a position between the maximally extended position of FIG. 13 and the minimally extended position. This causes slack to be introduced in the strap 1305 such that the strap 1305, the first device housing 1301, and the second device housing 1302 define a arm insertion aperture 1401.

In one or more embodiments, sliding the first device housing 1301 relative to the second device housing 1302 between the maximally extended position and the minimally extended position changes a perimeter length of the arm insertion aperture 1401 defined by the strap 1305, the first device housing 1301, and the second device housing 1302. This allows a person's arm to be inserted into the arm insertion aperture 1401 so that the electronic device 1300 can be worn as a wristwatch. When this sliding occurs, the flexible display 1304 wraps around the rotor (1314), thereby shortening the length of the flexible display 1304 spanning the first major surface 1303 of the electronic device 1300.

Figure 15:
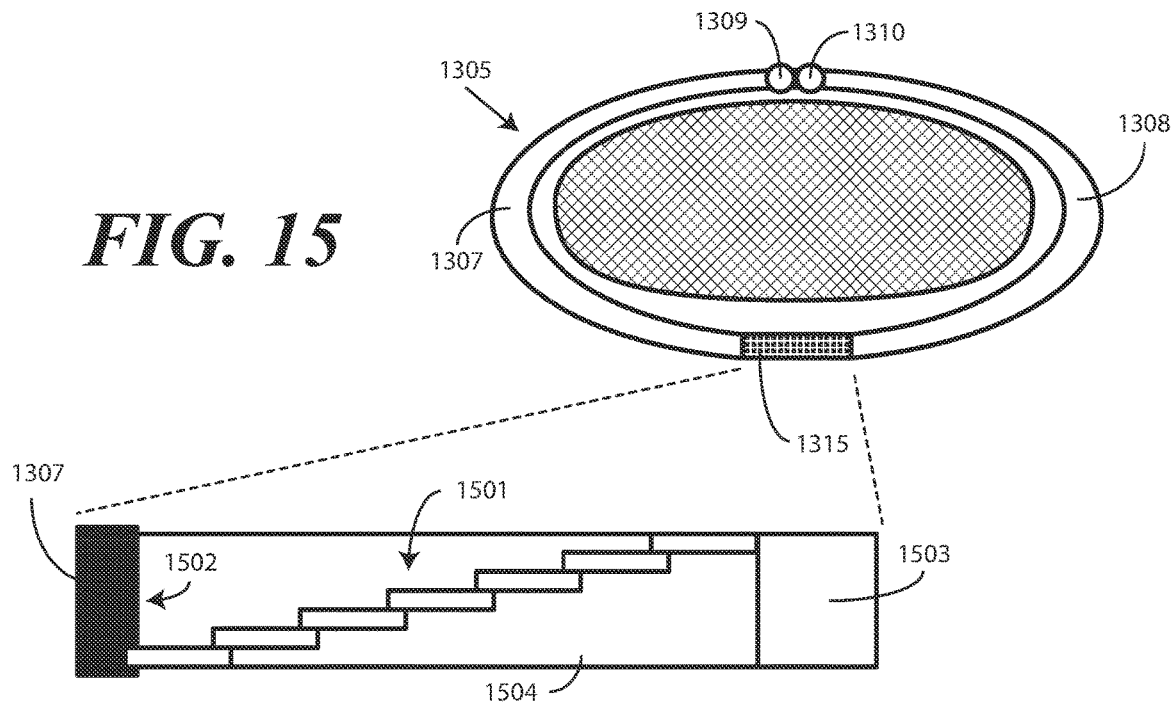
FIG. 15 illustrates a strap component detached from the electronic device of FIG. 14 in a wearable configuration.

In one or more embodiments the strap 1305 is selectively detachable from the electronic device 1300. Turning now to FIG. 15, illustrated therein is the strap 1305 after being detached from the electronic device (1300). This detachment allows the strap 1305 to be worn as a bracelet in a jewelry configuration when the first fastener 1309 attached to the first strap portion 1307 of the strap 1305 is coupled to the second fastener 1310 attached to the second strap portion 1308 of the strap 1305.

Also shown in FIG. 15 are details of the clasp 1315 extending from the end 1502 of the first strap portion 1307. While not shown in FIG. 15, in one or more embodiments a complementary clasp that is a mirror image of the clasp 1315 shown in FIG. 15 extends from the second strap portion 1308.

In one or more embodiments, so as to be adjustable, the clasp 1315 comprises a plurality of stair-stepped sliding clasp members 1501 that can be slid together, or apart, to change the overall length of the clasp 1315. The complementary clasp extending from the second strap portion 1308 can include another plurality of stair-stepped sliding clasp members that function in a similar manner.

In one or more embodiments, the plurality of stair-stepped sliding clasp members 1501 extends from an end 1502 of the first strap portion 1307, while the other plurality of stair-stepped sliding clasp members extends from an end of the second strap portion 1308. The clasp 1315 of FIG. 15 includes a clasp element 1503 as well. In one or more embodiments, the clasp element 1503 couples to a complementary clasp element attached to the other plurality of stair-stepped sliding clasp members of the complementary clasp extending from the end of the second strap portion 1308.

In one or more embodiments, to support the plurality of stair-stepped sliding clasp members 1501, the clasp 1315 further comprises an elastic material 1504 extending from the end 1502 of the first strap portion 1307 to the clasp element 1503, which is decorative in one or more embodiments. The complementary clasp extending from the second strap portion 1308 can include a similar piece of elastic material.

Embodiments of the disclosure contemplate that the overall length of the strap 1305 can vary as a function of the lengths of the first strap portion 1307, the second strap portion 1308, the number and length of stair-stepped sliding clasp members, and the size of the clasp element 1503. Embodiments of the disclosure also contemplate that lengths of between 141 millimeters and 196 millimeters will typically accommodate the majority of adult wrist sizes. Accordingly, the number, length, extension capability, and other characteristics of each stair-stepped sliding clasp members can be selected by the manufacturer, as needed, to ensure that one or both of the strap 1305 and/or strap 1305 attached to the electronic device (1300) of FIG. 13 will be able to adequately fit a broad range of wearer's wrists.

In one or more embodiments, the plurality of stair-stepped sliding clasp members 1501 may include up to thirteen clasp members that each extend up to six millimeters relative to their next clasp member neighbor. Other configurations for the strap 1305 and its extendable components will be obvious to those of ordinary skill in the art having the benefit of this disclosure.

Figure 16:
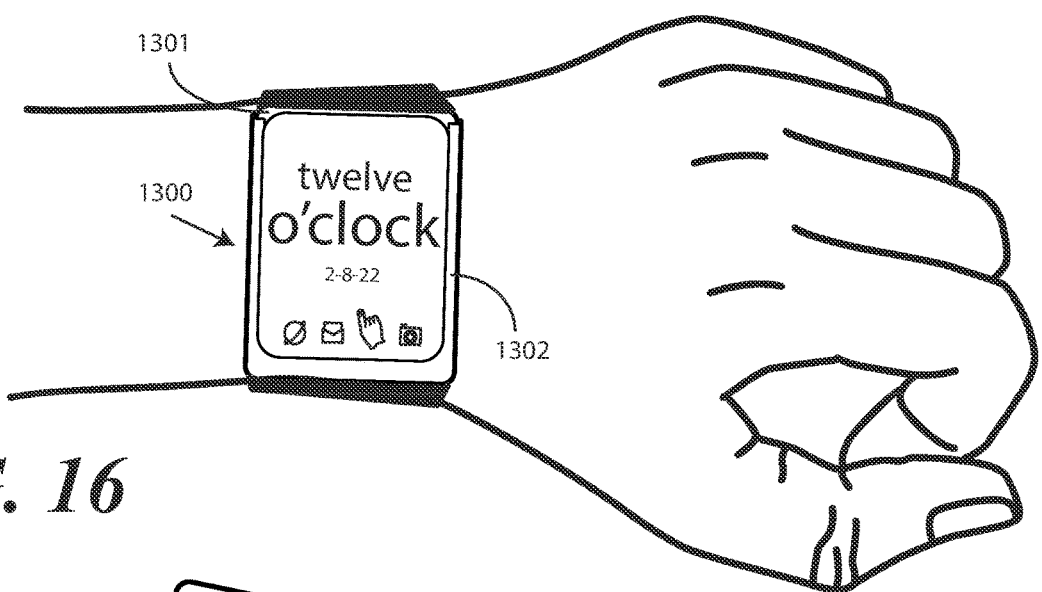
FIG. 16 illustrates one explanatory electronic device in accordance with one or more embodiments of the disclosure in a wearable configuration.
Figure 17:
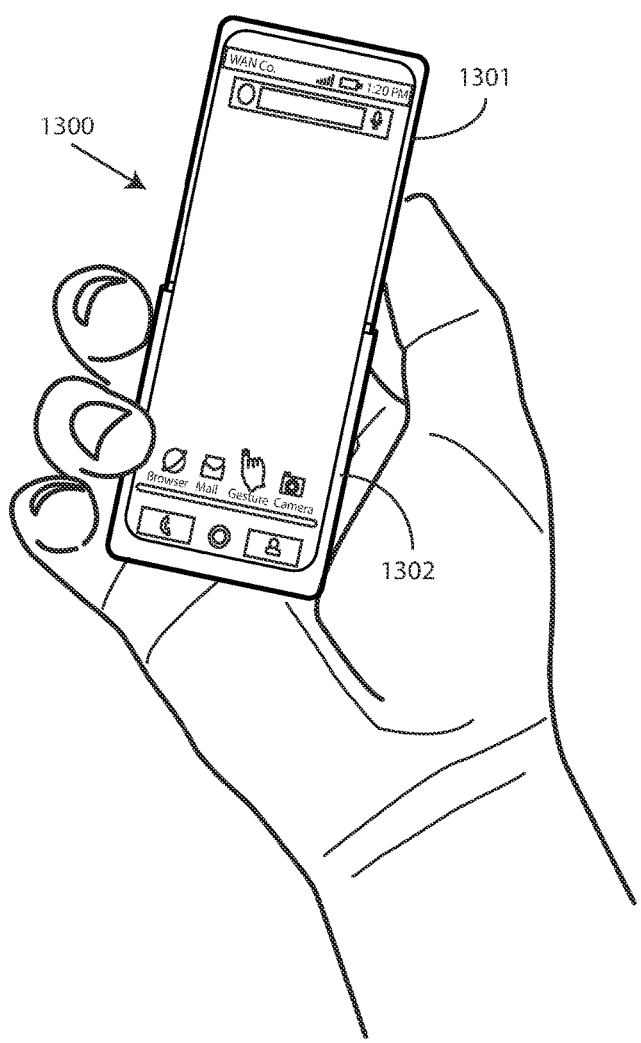
FIG. 17 illustrates the explanatory electronic device of FIG. 16 in a hand-held configuration.

The electronic device 1300 of FIG. 13 is shown in the handheld configuration, with the first device housing 1301 maximally inserted into the second device housing 1302, in FIG. 16. By contrast, the electronic device 1300 is shown in the handheld configuration with the first device housing 1301 maximally extended from the second device housing 1302 in FIG. 17.

Figure 18:
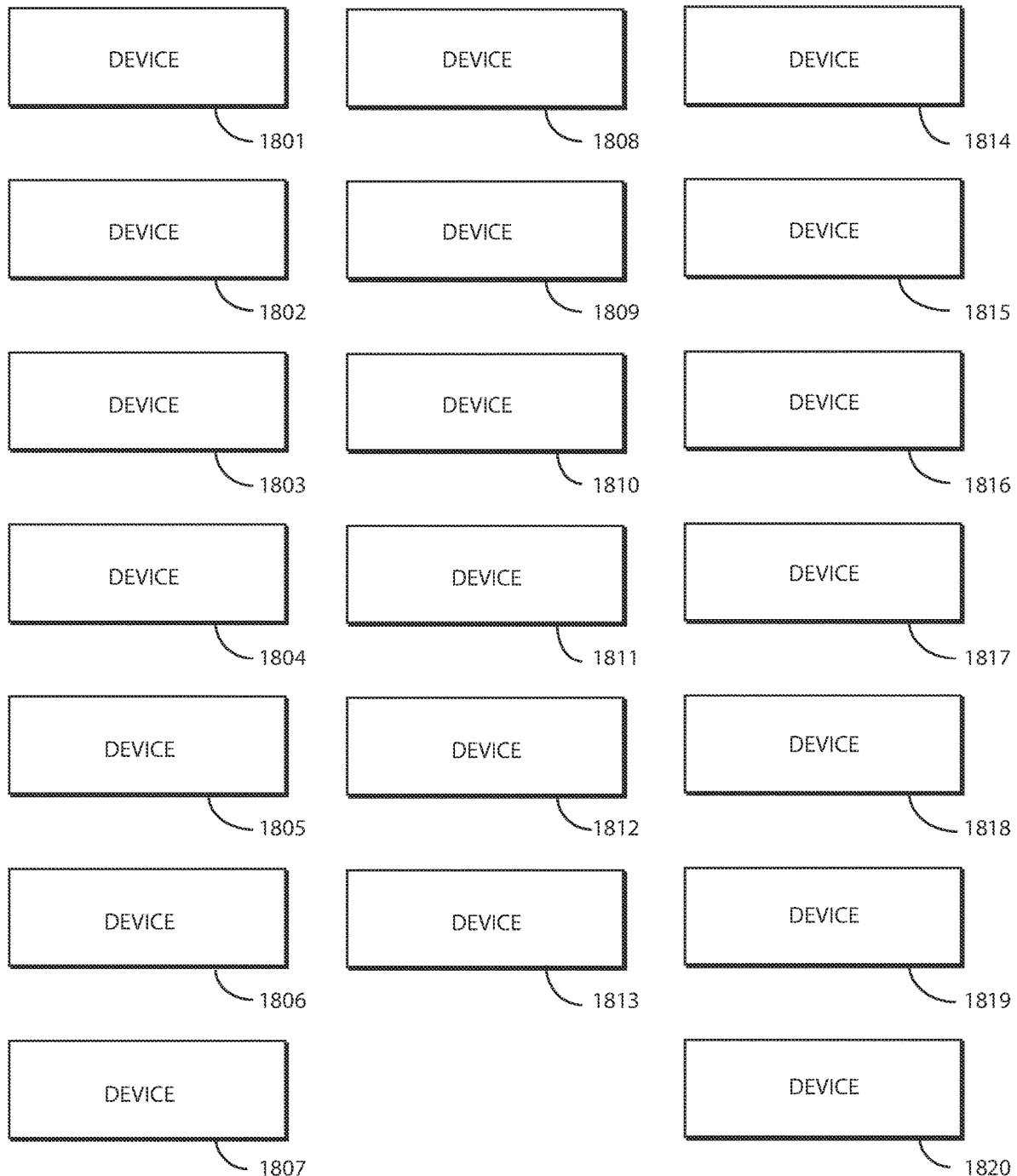
FIG. 18 illustrates various embodiments of the disclosure.

Turning now to FIG. 18, illustrated therein are various embodiments of the disclosure. The embodiments of FIG. 18 are shown as labeled boxes in FIG. 18 due to the fact that the individual components of these embodiments have been illustrated in detail in FIGS. 1-17, which precede FIG. 18. Accordingly, since these items have previously been illustrated and described, their repeated illustration is no longer essential for a proper understanding of these embodiments. Thus, the embodiments are shown as labeled boxes.

Beginning at 1801, an electronic device comprises a first device housing and a second device housing that is slidable relative to the first device housing. At 1801, the electronic device comprises a flexible display spanning a first major surface of the electronic device.

At 1801, the electronic device comprises a strap spanning a second major surface of the electronic device with a first end coupled to the first device housing and a second end coupled to the second device housing. At 1801, sliding the first device housing relative to the second device housing changes a perimeter of an arm insertion aperture defined by the strap, the first device housing, and the second device housing.

At 1802, the electronic device of 1801 further comprises a clasp coupling a first portion of the strap coupled to the first device housing to a second portion of the strap coupled to the second device housing. At 1803, the clasp of 1802 comprises a plurality of stair-stepped sliding clasp members extending from an end of one of the first portion of the strap or the second portion of the strap to a clasp element. At 1804, the clasp of 1803 further comprises an elastic material extending from the end of one of the first portion of the strap or the second portion of the strap to the clasp element.

At 1805, the first end of the strap of 1801 is pivotally coupled to the first device housing. At 1805, the second end of the strap is pivotally coupled to the second device housing.

At 1806, sliding the first device housing of 1805 away from the second device housing to a maximally extended position straightens the strap. At 1807, sliding the first device housing of 1805 away from the second device housing to a maximally extended position causes the strap to abut one or both of the first device housing or the second device housing. At 1808, the strap of 1805 is selectively detachable from the electronic device.

At 1809, the electronic device of 1808 further comprises a first fastener coupled to the first end of the strap, a second fastener coupled to the first device housing, a third fastener coupled to the second end of the strap, and a fourth fastener coupled to the second device housing. At 1809, the first fastener is selectively attachable to, and detachable from, the second fastener and the third fastener, and the third fastener is selectively attachable to, and detachable from, the first fastener and the fourth fastener.

At 1810, the electronic device of 1801 further comprises an energy storage device and one or more circuit components carried by a substrate and configured to operate the flexible display. At 1810, the energy storage device and the substrate are situated in an off-center alignment relative to the flexible display.

At 1811, the electronic device of 1801 further comprises a rotor positioned within a curvilinear section of the flexible display. At 1811, the flexible display passes around the rotor when the first device housing slides relative to the second device housing.

At 1812, an electronic device comprises a first device housing and a second device housing that is slidable relative to the first device housing. At 1812, the electronic device comprises a flexible display spanning a first major surface of the electronic device.

At 1812, the electronic device comprises a first coupler attached to a first device housing minor face and a second coupler attached to a second device housing minor face. At 1812, the first device housing and the second device housing are manufactured from a flexible material such that each can be deformed sufficiently to allow the first coupler to attach to the second coupler.

At 1813, the electronic device of 1812 defines a cylinder when the first coupler is attached to the second coupler. At 1814, the flexible display of 1813 is positioned on an exterior surface of the cylinder when the first coupler is attached to the second coupler.

At 1815, the electronic device of 1814 further comprises a first energy storage device, one or more circuit components carried by a first substrate, a second energy storage device, and one or more other circuit components carried by a second substrate. At 1815, the first energy storage device and the first substrate are positioned between the first coupler and the flexible display and the second energy storage device and the second substrate are positioned between the second coupler and the flexible display.

At 1816, an electronic device comprises a device housing defining a component chamber having one or more of an energy storage device or one or more circuit components carried by a substrate situated therein. At 1816, the electronic device comprises a deformable device housing arm extending distally from a side of the component chamber.

At 1816, the electronic device comprises a strap coupled to, and extending distally away from, a terminal edge of the deformable device housing arm. At 1816, the electronic device comprises a first coupler coupled to an end of the strap. At 1816, the electronic device comprises a second coupler and a third coupler situated on the device housing in different places. At 1816, the first coupler is selectively attachable to, and detachable from, either the second coupler or the third coupler.

At 1817, the component chamber, the deformable device housing arm, and the strap of 1816 define a loop when the deformable device housing arm is deformed into a curvilinear shape and the first coupler is attached to the second coupler. At 1818, the strap of 1817 abuts the deformable device housing arm when the deformable device housing arm extends linearly away from the component chamber and the first coupler is attached to the third coupler.

At 1819, the first coupler, the second coupler, and the third coupler of 1818 comprise magnetic couplers. At 1820, the electronic device of 1819 further comprises an extendable support plate that extends from the side of the component chamber. At 1820, the extendable support plate mechanically supports the electronic device when the deformable device housing arm extends linearly away from the component chamber.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims.

Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims.

What is claimed is:

1. An electronic device, comprising:
 a first device housing and a second device housing that is slidable relative to the first device housing;
 a flexible display spanning a first major surface of the electronic device; and
 a strap spanning a second major surface of the electronic device with a first end coupled to the first device housing and a second end coupled to the second device housing;
 wherein sliding the first device housing relative to the second device housing changes a perimeter of an arm insertion aperture defined by the strap, the first device housing, and the second device housing.

2. The electronic device of claim 1, further comprising a clasp coupling a first portion of the strap coupled to the first device housing to a second portion of the strap coupled to the second device housing.

3. The electronic device of claim 2, the clasp comprising a plurality of stair-stepped sliding clasp members extending from an end of one of the first portion of the strap or the second portion of the strap to a clasp element.

4. The electronic device of claim 3, the clasp further comprising an elastic material extending from the end of one of the first portion of the strap or the second portion of the strap to the clasp element.

5. The electronic device of claim 1, wherein the first end of the strap is pivotally coupled to the first device housing and the second end of the strap is pivotally coupled to the second device housing.

6. The electronic device of claim 5, wherein sliding the first device housing away from the second device housing to a maximally extended position straightens the strap.

7. The electronic device of claim 5, wherein sliding the first device housing away from the second device housing to a maximally extended position causes the strap to abut one or both of the first device housing or the second device housing.

8. The electronic device of claim 5, wherein the strap is selectively detachable from the electronic device.

9. The electronic device of claim 8, further comprising:
 a first fastener coupled to the first end of the strap;
 a second fastener coupled to the first device housing;
 a third fastener coupled to the second end of the strap; and
 a fourth fastener coupled to the second device housing;
 wherein:
 the first fastener is selectively attachable to, and detachable from, the second fastener and the third fastener; and
 the third fastener is selectively attachable to, and detachable from, the first fastener and the fourth fastener.

10. The electronic device of claim 1, further comprising an energy storage device and one or more circuit components carried by a substrate and configured to operate the flexible display, wherein the energy storage device and the substrate are situated in an off-center alignment relative to the flexible display.

11. The electronic device of claim 1, further comprising a rotor positioned within a curvilinear section of the flexible display, wherein the flexible display passes around the rotor when the first device housing slides relative to the second device housing.

* * * * *